Figure 1:
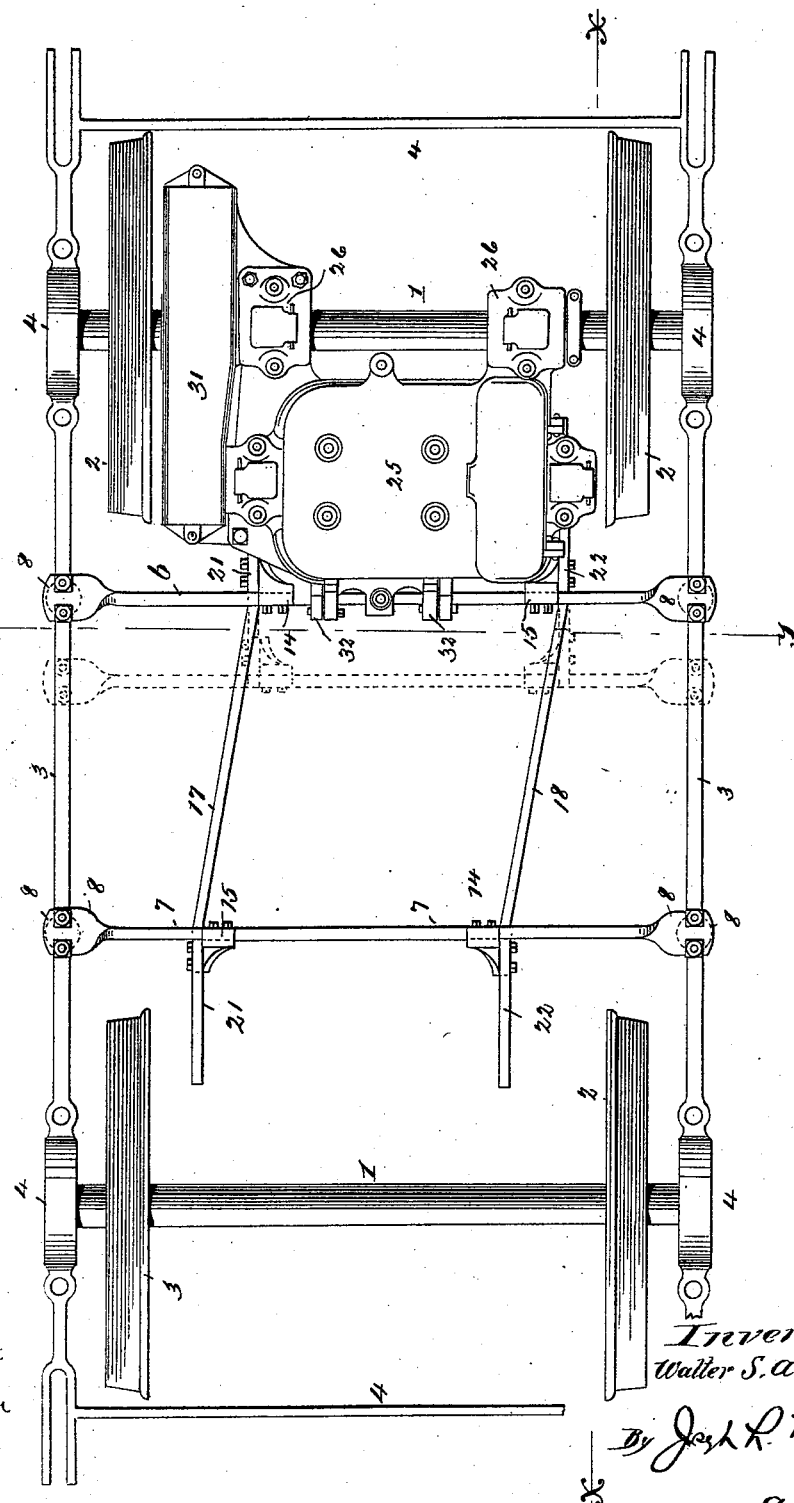

(No Model.) 4 Sheets—Sheet 1.
W. S. ADAMS.
MEANS FOR SUPPORTING MOTORS IN ELECTRIC LOCOMOTIVES.
No. 529,688. Patented Nov. 27, 1894.

Attest:
C. W. Benjamin
BS. Wise

Inventor:
Walter S. Adams
By Joseph L. Levy
atty.

(No Model.) 4 Sheets—Sheet 2.

W. S. ADAMS.
MEANS FOR SUPPORTING MOTORS IN ELECTRIC LOCOMOTIVES.

No. 529,688. Patented Nov. 27, 1894.

Attest:
C. W. Benjamin
B. S. Wyser

Inventor:
Walter S. Adams
By Joseph L. Levy
atty

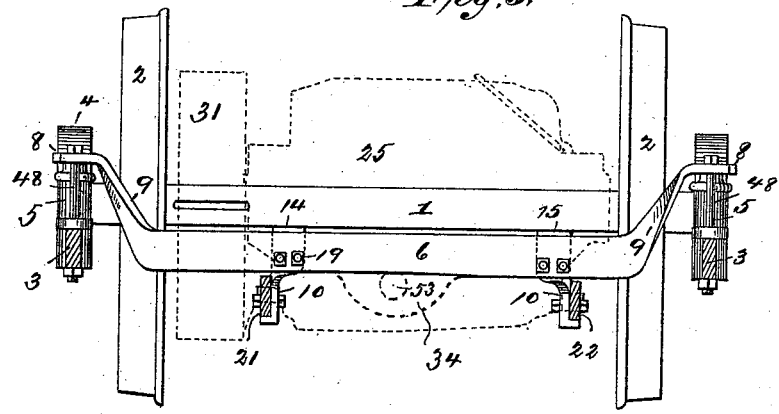

(No Model.) 4 Sheets—Sheet 4.

W. S. ADAMS.
MEANS FOR SUPPORTING MOTORS IN ELECTRIC LOCOMOTIVES.

No. 529,688. Patented Nov. 27, 1894.

Attest:
C. W. Benjamin
B. S. Nyer

Inventor:
Walter S. Adams,
By Joseph L. Levy
atty

UNITED STATES PATENT OFFICE.

WALTER S. ADAMS, OF PHILADELPHIA, PENNSYLVANIA, ASSIGNOR TO JOHN A. BRILL, OF SAME PLACE.

MEANS FOR SUPPORTING MOTORS IN ELECTRIC LOCOMOTIVES.

SPECIFICATION forming part of Letters Patent No. 529,688, dated November 27, 1894.

Application filed November 9, 1893. Serial No. 490,438. (No model.)

*To all whom it may concern:*

Be it known that I, WALTER S. ADAMS, a citizen of the United States, residing at Philadelphia, in the county of Philadelphia and State of Pennsylvania, have made certain new and useful Improvements in Supports for Electric Motors, of which the following is a specification.

My invention relates to devices for the support of one or more electric motors on an electrically propelled car truck.

It has been customary for a long time prior to my present invention to support the motor by sleeving one end in bearings on one of the truck axles and supporting the free end or nose of the motor by some suitable hanging from the truck frame, some times on cushions and other times metal to metal. This method of support invariably brought a greater portion of the weight of the motor and its appurtenances upon the axle, and it has very often occurred that the axle has become fractured between the wheels from this particular cause.

My invention has for its object to relieve the axle of approximately the major portion of the weight of the motor, say about four-fifths thereof, and cause this weight to be taken by a suspending frame, the frame having a support upon the truck frame within the wheel base of the truck, the motor being secured to the suspending frame preferably below the axle to which one end thereof is sleeved. This frame, when combined with the motor as set forth, takes approximately four-fifths of the weight of the motor from the axle, thus insuring a minimum amount of strain upon the axle with which the motor is connected. By reason of the peculiar construction of the suspending frame the dismantling of the motor can be readily accomplished and parts of the frame can be readily adjusted, both transversely and longitudinally, to accommodate the same to motors of varying dimensions, both transversely and longitudinally, and this without the alteration of any of the parts of the suspension frame or of the truck frame. My invention therefore resides in this particular in the structure of the motor suspending frame and the relative co-operative positions of the parts of the same with the motor and the truck.

Another part of my invention consists in an improved cushion for supporting the motor frame upon the truck frame, all of the improvements being hereinafter more specifically set forth and pointed out in the claims.

Reference is had to the accompanying drawings forming part of this specification, in which—

Figure 2:
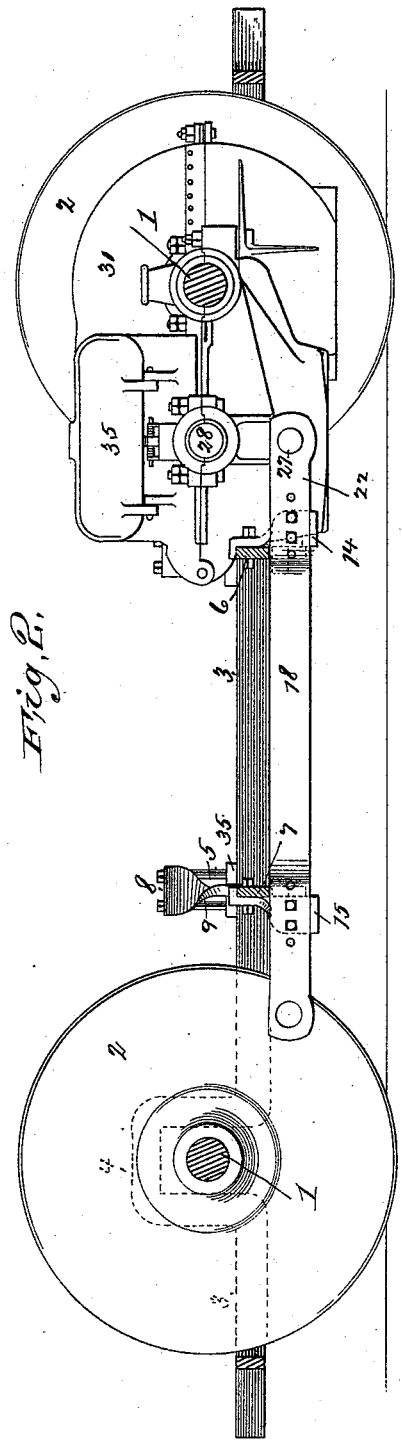
Figure 6:
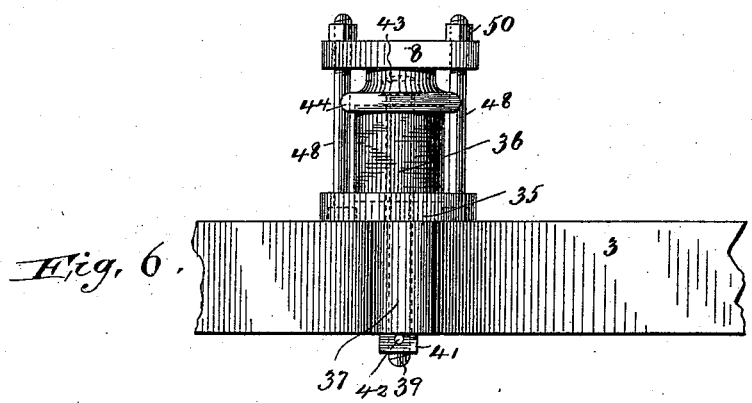
Figure 7:
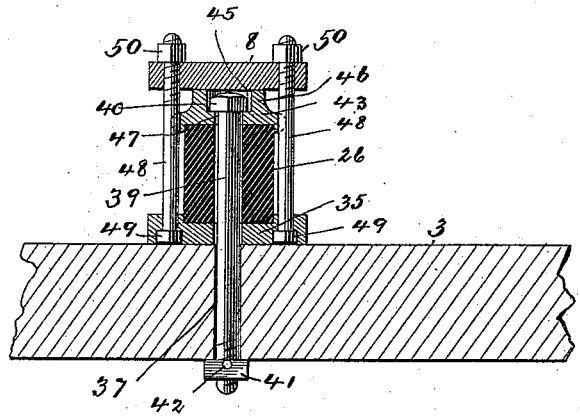
Figure 8:
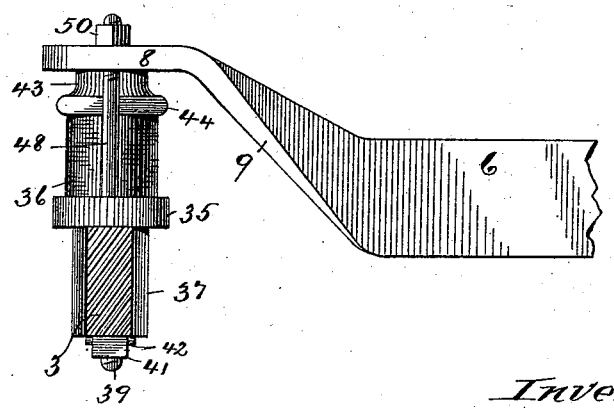

Figure 1 is a plan view of a truck of improved construction and my motor suspension applied thereto, showing the method of support of one motor and the capability of support of another one, all of the truck, except the axles, wheels and axle box frame, being omitted for the sake of clearness in illustration; Fig. 2, a sectional elevation of the same approximately on the line *x x*, Fig. 1; Fig. 3, a transverse sectional elevation approximately on the line *y y*, Fig. 1, looking toward the right hand of that view; Fig. 4, an isometric elevation of one of the transverse bars, the pair of longitudinal bars and their connecting hangers, showing the method of uniting the same, the parts being detached from the truck. Fig. 5 includes a face and end elevation respectively of one of the hangers; Fig. 6, a side elevation, outside, of a portion of the side bar of the truck axle box frame and my improved cushion mounted thereon; Fig. 7, a longitudinal sectional elevation of Fig. 6; Fig. 8, a side elevation, partly in section, showing the same parts as in Figs. 6 and 7, the cross bar being broken away to save space in illustrating.

Similar numerals of reference refer to like parts throughout the several views.

The truck to which I have applied my invention in the present case may be of any suitable form, although the one here illustrated has many desirable features.

At 1 are the axles, at 2 the wheels and at 3 the side bars, 4 the cross bars and 4ª the yokes or axle box saddles forming part of an axle box frame, in the yokes or saddles of which the axle boxes are secured in the usual manner. The structure of the axle box frame shown herein is set forth in the patent to John A. Brill, No. 492,525, dated February 28, 1893, to which cross reference is here made.

Located upon the side bars, in the manner hereinafter to be set forth, are elastic cushions 5, and between these elastic cushions are cross bars 6, 7 which comprise essentially the flat plates 8, the downward twist 9 and the main section 6 or 7, the twist being had for the purpose of getting the metal of the cross bars disposed vertically or on edge between the cushions on both sides of the truck, and also to preferably dispose the main sections 6 or 7 of the cross bar below the axle, as seen clearly in Figs. 2 and 3.

At 10 are shown what I call hangers which are formed of a flat piece of metal twisted at 11, so as to bring the parts or faces 12, 13 above or below the twist at right angles to each other, from the upper and lower portions of which extend at right angles the flanges 14, 15. The faces 12, 13 are provided with holes or other desired apertures 16 for a purpose hereinafter specified.

At 17, 18 are shown the longitudinal bars of the motor support. These bars are secured to and depend from the cross bars 6, 7 in the following way: The upper and lower faces of the hangers are secured to the vertical sides of the cross and longitudinal bars as shown in Fig. 4, both sets of bars being provided with apertures through which bolts 19, 20 pass for securing the hangers, cross and longitudinal bars together, the flanges of the hangers resting upon the top edge of the cross bar and the lower edge of the longitudinal bars 17, 18, preferably resting on the lower flanges of the hangers in both cases so as to relieve the securing bolts from strain and liability of shearing. It will be noticed by reference to Fig. 4 that the longitudinal bars extend approximately at right angles to the cross bar and that the longitudinal bars extend a short distance only from the cross bars. At each end the free ends 21, 22 of the longitudinal bars (so called by reason of the fact that such ends have no support upon any portion of the truck frame, other than the cross bars) are provided with apertures 23, 24. The motor shown at 25 in full lines in Figs. 1 and 2 and in dotted lines in Fig. 3 may be of any usual or preferred construction. This motor is sleeved to the axle by bearings 26 in which are the usual brasses for wear, and at each side of the motor or its casing are cast or formed transversely extending lugs 27 which lie in this case directly below the armature shaft 28, the armature shaft being in line with the axle and the lugs 27 considerably below both the armature shaft and the axle. The free ends 21, 22 of the longitudinal bars 17, 18 are so proportioned in length that the apertures 23, 24 can engage the lugs 27 and thus through the hangers support the motor to the cross bars, thence to the cushions 5.

By reference to Fig. 2 it will be seen that the major portion of the weight of the motor is taken primarily upon the longitudinal bars, and thence to the side bars of the axle box frame, or other appropriate part of the truck structure, and thus the axle is relieved; and further that the connection between the motor and its supporting frame is had below both the axle of the truck and the longitudinal center of the motor, so that all that is necessary to be done to dismantle the motor from its support is to remove the longitudinal bars from the hangers. In case a shorter motor is used, that is in its transverse length, the hangers can be moved toward the center of the truck and either extra bolt holes 29 drilled into the cross bars for the passage of the bolts 19 at the time, or the cross bars can be permanently provided with such holes, so that the transverse adjustment of the longitudinal bars can be had at any time desired, and the same operation can be gone through if the longitudinal bars are to be moved farther apart in order to support a wider motor. To support a motor of increased length, longitudinally of the truck, the longitudinal supporting bars 17, 18 can be moved to or from the axle at that end and secured in the desired position in the lower face of the hangers, for which purpose it can be permanently provided with bolt holes 30, or the holes can be drilled as occasion requires.

By reference to Fig. 1 it will be seen that the longitudinal bars 17, 18 are diagonally disposed between the cross bars 6, 7. This is not of necessity the only disposition to be made, and it is only of necessity in this case by reason of the fact that the motor is not set equally between the wheels but closer to one than the other, by reason of the gearing which is inclosed within the casing 31. If, however, the center of the motor is semi-distant between the wheels, then the cross bars would be straight instead of diagonally disposed and supported at any suitable point on the cross bars between the side bars of the axle box frame, or other part of the truck. It will also be noticed by reference to Fig. 1 that the motor suspending frame is adapted to support two motors. In order to utilize my invention to the support of one motor I can set the cross bars and supporting cushions at the desired points on the side bars and supplement the one cross bar by a further cross bar of the same or any other suitable construction, as shown in dotted lines, (or increase the size or change the structure of the cross bar) to which the hangers 10 and longitudinal bars could be secured in the same manner as hereinbefore described, and I prefer in this connection to use two cross bars constructed similarly so that each truck will be complete with two cross bars and two sets of hangers, in which case I should prefer that both of the cross bars be located closer to the wheel base center of the truck, for obvious reasons. If it is subsequently desired to use two motors, the only necessary change would be to use longer longitudinal bars, say of the proximate length shown in Fig. 1. The free ends 21, 22 of the longitudinal bars, when acting as supports for the motor, transfer their motion up and down to the elastic cushions, and thus the motion of the motor frame is counteracted. These cushions, so far as the motor support is concerned, may or may not be used. I have shown the cross bars as lying close up against the front or nose of the motor and under the hinges 32 of the casing thereof. This is done in this case solely for the purpose of enabling the cross bars to engage a lug 53 shown in dotted lines in Fig. 3, which is formed on the front or free end of the motor to engage with an aperture formed in the cross bar in an enlargement 34 shown in dotted lines in that figure. The class of motor which I have specially illustrated here being provided with this lug I have shown the cross bars extending between the side bars of the axle box frame at a point which enables said lug to enter the recess, so that such a motor can be supported from three points. This triplex suspension I do not prefer, but prefer to have the cross bar extend between the side bars at a point so far removed from the front of the motor as to enable the same to clear the cross bar when it, the motor, is vibrated on its bearings on the axle after being disconnected with the frame, for which purpose the truck is usually run over a pit so as to readily get at the motor for repairs, and still further I consider the union of the motor with the motor frame at the longitudinal bars sufficient without using the cross bar connection.

At Figs. 6, 7 and 8 is shown the elastic support for the cross bars. This is constructed as follows: At 35 is shown a casting having a central annular recess, which casting forms a seat or cup for an elastic block or rubber cushion 36, the spring cup resting upon the side bar 3 which is preferably provided with a circular enlargement 37 to give a good bearing to the spring cup, the side bar, the spring cup and cushion having an aperture for the passage of a bolt 39 having an enlarged head 40 and a nut 41 through which is preferably passed a cotter 42, the nut 41 bearing against the bottom of the side bar 3. On the top of the cushion 36 rests a cap 43 provided with an annular recess in its bottom for the reception of the cushion, a peripheral flange 44 and a recess 45 within an annular rise 46, and a further aperture 47 passing through its bottom. The bolt 39 extends through the cap and through the cushion, spring cup and side bar, the apertures being preferably wider than the diameter of the bolt so as to allow of a transverse and longitudinal play of the cushion and its associated elements on the side bar for a purpose hereinafter explained, and the enlarged head 40 of the bolt 39 lies within the recess 45, the bolt head resting upon the bottom of said recess, said recess being wider than the head in order to allow the play stated. On the top of the rise 46 lies the flat plate 8 of the cross bar 6, and the spring cup 35 and the plate 8 are connected together by means of bolts 48 which pass through apertures in the plate 8 and which are provided with enlarged heads 49 which are received in recesses formed on the under side of the spring cup 35, the nuts 50 of the bolts resting on top of the plate 8. Through this structure resilient resistance is offered to the up and down movement or oscillation of the cross bar by a single elastic cushion.

I am aware that it is not new to combine a cross bar of substantially the same shape, and of other shapes, with cushions whereby the upward and downward movement of the cross bar is resisted, but I believe myself to be the first to have employed but a single cushion and associated with it means for bringing that single cushion into play to resist both the upward and downward movement of the cross bar. Thus should the movement of the cross bar be upwardly the plate 8 will draw the bolts 48 upward, moving the spring cup 35 against the cushion 36 compressing it against the spring cap 43 which is restrained from rising by the bolt 39, the enlarged head or nut of which bears against the bottom of the side bar. When the reverse movement takes place the plate 8 of the cross bar 6 will bear on the rise of the spring cap, compressing the cushion, which is resisted by both the spring cup and the side bar 3 of the axle box frame, the bolt 39 following the spring cap and cushion downward by reason of its own weight, and should the compression of the cushion be greater than the distance between the top of the head 40 of the bolt 39 and the under side of the plate 8, and should the bolt 39 stick in any of the apertures through which it passes, the under side of the plate 8 will bear down on the head thereof and force it down; so that it will be seen that whether upward or downward, the movement of the cross bar is successively resisted by one and the same cushion.

The annular rim 44 of the spring cap is provided with two semicircular recesses, within which lies a portion of the bolts 48, the recesses enabling the bolts to be brought closer to the cushion, and the bolts acting as guide posts for the movement of the spring cap and a restraining means for preventing it from turning.

With my construction I have reduced the number of parts substantially one-half from the number hitherto employed in devices for resisting the movement of the motor or its support by oppositely acting cushions, and the central bolt 39 is made much shorter, and through the entire construction much economy in cost of material, manufacture and space is had, and simplicity of structure and certainty of action is accomplished, the only exception being that I have added the two short bolts 48.

It is well known to those skilled in the art that the side bars or the axle box frame, when the side bars are so united as to form a frame, have a movement in the direction of the axle or transversely of the truck, sometimes from intentional construction and at other times from wear both in the motor connections and in the truck running gear, in which case the motor or the truck frame would move longitudinally or transversely. I have accommodated the parts in my structure so that this transverse, longitudinal, or rocking movement can be had by the cross bar, the cushion, and its associated elements upon the side bar, with or without transferring to the bolt 39 such movement, the plate 8 of the cross bar and the spring cup 35 being squarely bound together by the bolts 48, of which movements the bolt 39 may or may not partake.

From the foregoing it must be clearly seen that I do not limit myself as to my motor suspension frame to its association with any particular form of truck structure, nor to resiliently supporting said frame upon the truck, as the cross bars may be secured to the truck frame metal to metal, nor to the combination therewith of any particular kind of resilient support for the cross bar.

It is further apparent that my invention, so far as it relates to the elastic support of the cross bar upon the side bars or any convenient portion of the truck, is not limited to the specific structure here shown.

I have used in the claims the phrase "a single elastic cushion" and by this I do not wish myself to be understood as limiting the form of elastic support to one wherein but a single cushion in fact is used, but mean to include therein a single or a number of elastic cushions or springs wherein its or their compression is in but one direction only at one particular movement of the cross bar, as distinguished from the use of two or more cushions, each one of which is adapted to be brought into play during opposite movements of the cross bar.

I do not claim the combination with an electric motor centered upon an axle of the vehicle, of trunnions upon the outside of the motor vertically in line with its center of gravity, and longitudinal bars supported by the wheel base of the vehicle, to which bars said trunnions are pivotally connected, as I am not the first inventor of such combination, as broadly stated.

Having described my invention, I claim—

1. The combination, in a truck, of a truck frame, a separate motor suspension frame, longitudinal bars included in said frame, said frame being suspended between the side bars and wheels of the truck, extending longitudinally of the truck, and having its sole support on said side bars, a motor supported at one end by one of the axles of the truck, the motor and its separate frame being connected at a point within the outer limits of the motor or its casing, whereby the major portion of the weight may be taken upon the ends of said longitudinal bars, and the truck axle relieved therefrom, substantially as described.

2. An electric motor sustained beneath the body of a car or vehicle by a pair of longitudinally extending bars, cross bars secured to the side bars of the truck between the wheels, hangers depending from the cross bars, the longitudinal bars having a support upon said hangers, the motor being detachably secured to said longitudinal bars at their ends, the end of the motor opposing such connection being geared to and carried upon one of the axles of the car or truck wheels, substantially as described.

3. In a motor truck having a frame and a cross bar included therein the combination, with one of the truck axles, of a motor geared thereto, a longitudinal motor frame, the frame being suspended from the cross bar below the mutual central line of the truck axles, the motor and its supporting frame being connected at a point within the outer limits of the motor or its casing, and below its armature shaft, longitudinally, substantially as described.

4. The combination, with a truck, of the truck side bars, a motor partly supported on one of its axles, the cross bars, longitudinal bars, and hangers for supporting the longitudinal bars below the cross bars, the motor engaging the proximate ends of the longitudinal bars, substantially as described.

5. In a motor truck, the combination, with a truck frame, of the hangers 10, the cross bars, and the longitudinal bars hung from said cross bars by the said hangers, the ends of said longitudinal bars extending beyond the cross bars and adapted to be detachably secured to a motor, substantially as described.

6. The combination, with the truck side bars, of the cross bars 6, one or more reverse-faced hangers 10 having flanges extending from the upper part thereof in opposite directions, one or more longitudinal bars 21, the cross and longitudinal bars abutting against the faces of said hanger, the said flanges abutting against the upper and lower portions of the cross and longitudinal bars, and means for securing the hanger to said bars, substantially as described.

7. The combination, in a motor truck, of the side bars, the cross bars, the longitudinal bars suspended below the side bars, and means for adjustably suspending said longitudinal bars to the cross bars, substantially as described.

8. The combination, with the cross bar and longitudinal bars, of the hangers 10 having their bodies twisted centrally to form the reversed faces, the flanges extending from the top and bottom of the hangers, each being disposed at right angles to the other, the said faces being provided with apertures, the longitudinal bars lying below the cross bar, all of said bars being placed on edge, the flanges resting against the top and bottom edges of both sets of bars, and bolts for securing the cross bar to the upper face of the hangers, and like means for securing the lower faces of the hangers to the longitudinal bars, substantially as described.

9. In a motor support, the combination with a single elastic cushion, and a motor supporting bar resting thereon, of a suitable support for said cushion, connections between the top of the cushion and said support, and between the motor bar and the bottom of said cushion, whereby motion of said bar up and down can be resiliently resisted by said cushion, substantially as described.

10. The combination, in a motor truck, of a single elastic cushion, a cross-bar resting on the cushion, and a support for said cushion on the truck, means for connecting the cross bar and the bottom of the cushion, and a bolt connecting said truck frame with the top of the cushion, the support for the cushion resisting downward movement of the cross bar and allowing the cushion to become compressed, the bolt restricting the upward movement of the cross bar and compressing the cushion, substantially as described.

11. In a motor support, the combination, with a single cushion, of a cross bar adapted to be connected with a motor, means for supporting and securing said cushion on an appropriate part of a truck, and devices connected with the top of the cushion and the truck, and the bottom of said cushion and the cross bar whereby the movement of the cross bar, either upwardly or downwardly, will be resiliently resisted by such single cushion, substantially as described.

12. The combination with the cushion 36, the bar 3, the upwardly movable spring cup 35, the spring cap 43, the cushion extending between the cap and cup, the bolt 39 uniting the spring cap 43 with the bar 3, the plate 8, and means for securing said plate to the spring cup 35, substantially as described.

13. The combination, with the cushion 36, and bar 3, of the spring cup and cap 35, 43, the connecting bolt 39 passing through the cup, cap, cushion and bar, the plate 8, and the bolts 48 connecting the plate 8 with the spring cup, substantially as described.

14. The combination, with the plate 8 and bar 3, of the spring cup, the elastic cushion and spring cap, the spring cap having the rise 46 and recess 45 therein, and the headed bolt 39 extending between said recess and the bar 3, and connections between the plate 8 and spring cup, substantially as described.

15. The combination, with the plate 8 and bar 3, of the spring cup, the cushion seated therein, the spring cap 43 on top of the cushion having peripheral recesses, the bolt 39 extending between the spring cup and the bar 3, and the bolts 48 extending between the plate 8 and the spring cup and lying wholly or partly within the peripheral recesses of the spring cap, substantially as described.

16. The combination, with the bar 3 and plate 8, of the cup 35, cap 43, cushion 36, the plate 8 and cup 35 being connected, and a bolt 39 passing through an aperture in the bar cup, cushion, and cap, the parts being arranged to allow a movement thereof on said bar, substantially as described.

Signed at Philadelphia, in the county of Philadelphia and State of Pennsylvania, this 1st day of November, 1893.

WALTER S. ADAMS.

Witnesses:
R. S. REED,
R. S. HOAGLAND.